2,920,046

LUMINESCENT MATERIALS

Peter Whitten Ranby, London, England, assignor to Thorn Electrical Industries Limited No Drawing. Application July 22, 1953
Serial No. 369,739

Claims priority, application Great Britain July 24, 1952

2 Claims. (Cl. 252—301.4)

This invention relates to luminescent materials for use in fluorescent discharge lamps, cathode ray tube screens and X-ray screens.

Artificial luminescent materials have been disclosed comprising the borates of, among others, calcium, strontium, barium and cadmium activated by, among others, lead or by lead and manganese. The production of the materials in the sintered, or the crystalline or the vitreous form is contemplated and the disclosure states in effect that, if they are to be produced in the vitreous form, the proportion of the borate radical present should be greater than that corresponding to the metaborate; but otherwise the said proportion need only be sufficient to form the metaborate, though higher proportions are permissible. In the metaborates the ratio of metal oxide (MO) to boric oxide ($B_2O_3$) is 1:1.

It is an object of this invention to provide artificial luminescent materials which can be obtained directly as soft powders after the final firing operation by which the materials are formed.

According to this invention an artificial luminescent material is provided, comprising the borate of one or more of the metals calcium, strontium, barium or cadmium activated by manganese and lead, or by manganese and bismuth, or by manganese, lead and bismuth, the material being prepared by heating an initial mixture of starting materials in which the ratio of metal oxide (excluding the activators) to boric oxide lies between 1:2 and 1:7 inclusive, and in which the activators are present as a compound or compounds thereof.

Preferably, the ratio of metal oxide (excluding the activators) to boric oxide is 1:4½. The proportions of the activators present, for each gram-molecule of metal oxide (excluding the activators) in the matrix, may be from 0.001 to 0.1 gram-atom inclusive of manganese, from 0.005 to 0.4 gram-atom inclusive of lead, if present, and from 0.005 to 0.7 gram-atom inclusive of bismuth, if present.

Also according to this invention there is provided a method of preparing an artificial luminescent material which comprises the borate of one or more of the metals calcium, strontium, barium or cadmium, activated by manganese and lead, or by manganese and bismuth, or by manganese and lead and bismuth, the method including the steps of heating an initial mixture of starting materials, in which the ratio of metal oxide (excluding the activators) to boric oxide lies between 1:2 and 1:7 inclusive and the activator or activators are present as a compound or compounds thereof, at a temperature above about 600° C. but below the melting point of the luminescent material, grinding the material resulting from the heating, and reheating the ground material at a temperature above about 600° C. but below the melting point of the luminescent material.

The said heating temperature and the said reheating temperature may have substantially the same value and the said reheating of the ground material may be effected in an atmosphere of steam.

Materials prepared in accordance with the invention are found to have the unexpected property that they can be obtained directly in the form of soft powders, as the result of the firing process at a temperature (e.g. about 700° C.) which would normally be expected to cause the formation of aggregates, or even melting of the matrix materials. Thus, the final materials do not require prolonged mechanical grinding to reduce them to the powder form in which they are usually required.

It has been found that the diffraction pattern obtained by X-ray analysis of, for example, a strontium borate having a composition within the limits specified for the initial mixture and as according to this invention, is different from that obtained with strontium metaborate.

The calcium, strontium, barium or cadmium can be incorporated in the initial mixture as the oxide, but it is usually more convenient to use compounds which decompose to the oxide on heating such as the hydroxides, nitrates, carbonates, oxalates etc. The boric oxide may be added to the initial mixture as such or as boric acid or an ammonium borate. Alternatively, a borate of calcium, strontium, barium or cadmium may be precipitated from pure solutions of the metal salt and of a soluble borate, and the washed and dried precipitate mixed with the required amount of boric oxide, boric acid or ammonium borate to give the preferred ratio of metal oxide to boric oxide in the initial mixture.

The activating metals can be added to the initial mixture as compounds such as carbonates, halides, borates etc.

The luminescent materials are prepared by heating the respective initial mixtures at temperatures above about 600° C. but below the melting point of the luminescent material. The heating can be carried out in open or closed crucibles. The luminescent materials can be prepared by heating in an atmosphere of steam and under certain conditions such an atmosphere is preferred. For example, in the case of barium borate activated by lead and manganese, refiring of the luminescent material in steam after a preliminary firing in air tends to cause an increase in the wavelength of the light emitted.

Embodiments of the invention will now be described by way of example:

All the materials used should be of the high degree of purity which is recognized in the art as being necessary for the preparation of luminescent materials.

The luminescence exhibited by the materials described below is that obtained upon excitation by ultraviolet light of short wavelength e.g. 2537 A.U. Apparently, the materials are not excited by longer wavelength ultraviolet light e.g. 3650 A.U.

Example 1

Strontium carbonate, boric acid, lead fluoride and manganese chloride in the form of fine powders are intimately mixed together in the molecular proportions:

$$1SrCO_3 : 9H_3BO_3 : 0.082PbF_2 : 0.0081MnCl_2$$

and the mixture is heated for half an hour at 800° C. in an open crucible. When cool, the product is crushed, ground and reheated for a further half an hour at the same temperature. The product exhibits a bright green luminescence.

Example 2

If the method of Example 1 is modified by replacing the strontium carbonate in the initial mixture by a chemically equivalent amount of cadmium carbonate the final product shows a pale green luminescence.

Example 3

If the method of Example 1 is modified by replacing half the strontium carbonate by an equivalent amount of calcium carbonate, the product shows a yellow green luminescence.

Example 4

Barium carbonate, boric acid, bismuth carbonate and manganese chloride in the form of fine powders are intimately mixed together in the molecular proportions:

$1BaCO_3:9H_3BO_3:0.34(Bi_2O_2CO_3)_2H_2O:0.008MnCl_2$ and the mixture is heated for half an hour at 700° C. in an open crucible. When cool the product is crushed, ground, and reheated for a further half an hour at the same temperature. The final product exhibits a yellow green luminescence.

Example 5

If the method of Example 4 is modified by using four times as much manganese chloride, the product shows an orange luminescence.

Example 6

If the method of Example 4 is modified by reheating the product in steam, the luminescence becomes more yellow in colour.

Example 7

Barium carbonate, calcium carbonate, boric acid, bismuth oxide and manganese chloride in the form of fine powders are intimately mixed together in the molecular proportions:

$0.63BaCO_3:0.37CaCO_3:9H_3BO_3:0.14Bi_2O_3:0.08MnCl_2$ and the mixture is heated for 1 hour at 700° C. in an open crucible. When cool the product is thoroughly ground and reheated for four hours at 700° C. The final material shows an orange-pink luminescence under excitation by radiation of 2537 A.U. wavelength.

Example 8

If the method of Example 1 is modified by incorporating 0.01 atom of bismuth (as the carbonate) per mole of strontium carbonate the product shows a green luminescence.

Example 9

If the method of Example 7 is modified by incorporating 0.1 mole of lead fluoride per 9 moles of boric acid, the luminescence of the product is more pink in colour than the material activated by only bismuth and lead.

I claim:

1. An artificial luminescent material in the form of a soft powder and comprising the borate of at least one of the metals selected from the group consisting of calcium, strontium, barium and cadmium, said borate being activated by 0.001 gram atom to 0.1 gram atom of manganese and between about 0.005 to 0.7 gram atom of bismuth, and in which the ratio of metal oxide, exclusive of the activator, to boric acid lies between ½ and 1/7.

2. The method of preparing a soft borate phosphor powder, said method comprising the steps of: heating a mixture of a compound of a metal element selected from the group consisting of calcium, cadmium, strontium and barium, with a compound of boron, said compounds in each case being selected from the group consisting of the oxides and compounds reducible to the oxides, of the elements mentioned, and in which the ratio of metal oxide to boric oxide lies between ½ and 1/7, the mixture including also an activating compound of manganese and of a substance selected from the group consisting of lead and bismuth, the lead being in an amount from about 0.005 to 0.4 gram atom, the bismuth in an amount from about 0.005 to 0.7 gram atom, and the manganese from about 0.001 gram atom to 0.1 gram atom, for each gram molecule of metal oxide, the heating of the mixture being done at a temperature above about 600° C. but below its melting point; grinding the resultant material, and reheating the ground material at a temperature above 600° C. but below its melting point.

References Cited in the file of this patent

UNITED STATES PATENTS

| 2,241,950 | Huniger | May 13, 1941 |
| 2,270,124 | Huniger | Jan. 13, 1952 |